United States Patent
Wu et al.

(10) Patent No.: US 10,677,423 B2
(45) Date of Patent: Jun. 9, 2020

(54) LIGHT EMITTING DEVICE AND BACKLIGHT MODULE

(71) Applicant: Lextar Electronics Corporation, Hsinchu (TW)

(72) Inventors: Yin-Cyuan Wu, Yunlin County (TW); Yu-Chang Wu, Hsinchu (TW); Yun-Yi Tien, Hsinchu (TW)

(73) Assignee: LEXTAR ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/214,128

(22) Filed: Dec. 9, 2018

(65) Prior Publication Data

US 2020/0072442 A1 Mar. 5, 2020

(30) Foreign Application Priority Data

Aug. 28, 2018 (CN) .......................... 2018 1 0986152

(51) Int. Cl.
*F21V 9/38* (2018.01)
*F21Y 115/10* (2016.01)

(52) U.S. Cl.
CPC ............. *F21V 9/38* (2018.02); *F21Y 2115/10* (2016.08)

(58) Field of Classification Search
CPC ..................... G02F 1/133602; G02F 1/133603
See application file for complete search history.

(56) References Cited

U.S. PATENT DOCUMENTS

2012/0099048 A1* 4/2012 Yamazaki ......... G02F 1/133514
349/62
2019/0225845 A1* 7/2019 Lee ........................ C09J 133/08

\* cited by examiner

*Primary Examiner* — Anne M Hines
(74) *Attorney, Agent, or Firm* — CKC & Partners Co., LLC

(57) ABSTRACT

A light emitting device includes a circuit board, light-emitting diodes, an optically clear adhesive layer and a transparent film. The light-emitting diodes are disposed on a surface of the circuit board. The optically clear adhesive layer is disposed on the surface of the circuit board and covers the light-emitting diodes. The transparent film is disposed over a side of the optically clear adhesive layer distant from the circuit board. A hardness of the transparent film is greater than a hardness of the optically clear adhesive layer.

20 Claims, 7 Drawing Sheets

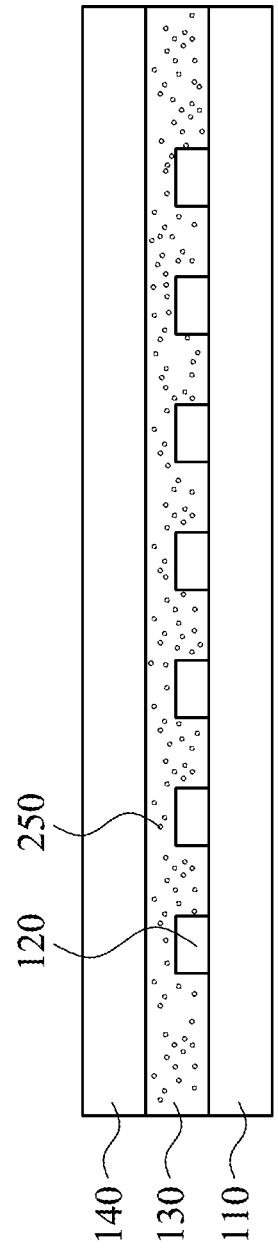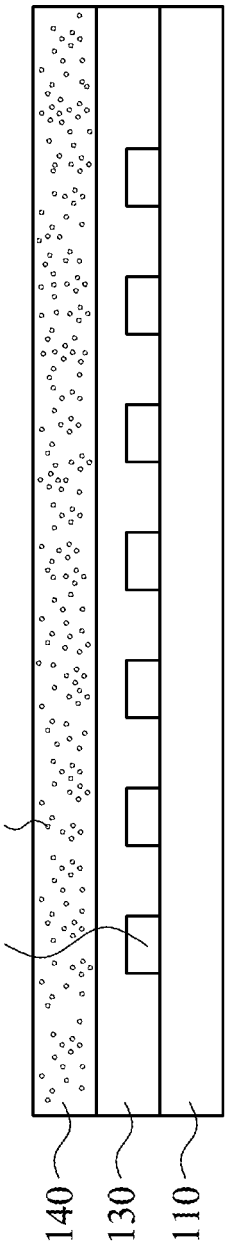

LIGHT EMITTING DEVICE AND BACKLIGHT MODULE

RELATED APPLICATIONS

This application claims priority to China Application Serial Number 201810986152.1, filed Aug. 28, 2018, the disclosure of which is incorporated herein by reference in its entirety.

BACKGROUND

Technical Field

The present disclosure relates to a thin light emitting device and a backlight module.

Description of Related Art

In a conventional direct-type LED backlight module, each LED is collocated with a lens, and there is a light-mixing distance between the lens and a diffuser located above the lens, and thus the thickness of the LED backlight module cannot be further reduced, thus becoming a major obstacle for the pursuit of thin-type display. The aforementioned problems urgently needed to be solved by those skilled in relevant art.

SUMMARY

In view of the foregoing, one of the objects of the present disclosure is to provide a thin light emitting device.

In accordance with an embodiment of the present disclosure, a light emitting device includes a circuit board, light-emitting diodes, an optically clear adhesive layer and a transparent film. The light-emitting diodes are disposed on a surface of the circuit board. The optically clear adhesive layer is disposed on the surface of the circuit board and covers the light-emitting diodes. The transparent film is disposed over a side of the optically clear adhesive layer distant from the circuit board. A hardness of the transparent film is greater than a hardness of the optically clear adhesive layer.

In one or more embodiments of the present disclosure, a refractive index of the transparent film is greater than a refractive index of the optically clear adhesive layer.

In one or more embodiments of the present disclosure, the transparent film is formed from materials including at least one of polyethylene terephthalate, polycarbonate, polymethyl methacrylate, cellulose triacetate, and polypropylene.

In one or more embodiments of the present disclosure, a distance between a surface of the transparent film distant from the optically clear adhesive layer and the circuit board is smaller than 1.5 mm.

In one or more embodiments of the present disclosure, the light-emitting diodes include blue light-emitting diodes.

In one or more embodiments of the present disclosure, the light emitting device further includes a wavelength conversion layer. The wavelength conversion layer is disposed on a side of the transparent film distant from the optically clear adhesive layer or is disposed between the optically clear adhesive layer and the transparent film. The wavelength conversion layer is configured to convert a portion of blue light emitted by the blue light-emitting diodes to non-blue light.

In one or more embodiments of the present disclosure, the wavelength conversion layer includes a first wavelength conversion material configured to generate light having a main peak wavelength falling within a yellow spectral range.

In one or more embodiments of the present disclosure, the wavelength conversion layer includes a second wavelength conversion material and a third wavelength conversion material. The second wavelength conversion material is configured to generate light having a main peak wavelength falling within a green spectral range. The third wavelength conversion material is configured to generate light having a main peak wavelength falling within a red spectral range.

In one or more embodiments of the present disclosure, the light-emitting diodes include LED chips, mini LED chips, micro LED chips, or LED packages.

In one or more embodiments of the present disclosure, the light emitting device further includes a fourth wavelength conversion material disposed over the light-emitting diodes.

In one or more embodiments of the present disclosure, the light emitting device further includes a fifth wavelength conversion material distributed in the optically clear adhesive layer or the transparent film.

In one or more embodiments of the present disclosure, a surface of the transparent film distant from the optically clear adhesive layer has plural optical pattern groups configured to reflect light emitted by the light-emitting diodes.

In one or more embodiments of the present disclosure, each of the optical pattern groups includes plural reflective patterns. Each of the optical pattern groups has a center aligned with a corresponding one of the light-emitting diodes. The reflective patterns in each of the optical pattern groups are arranged outwardly from the center in order of decreasing size.

In one or more embodiments of the present disclosure, the reflective patterns are formed from materials including at least one of aluminum oxide, boron nitride, microcellular polyethylene terephthalate, barium sulfate, calcium carbonate, titanium dioxide and silicon dioxide.

In accordance with an embodiment of the present disclosure, a backlight module includes the aforementioned light emitting device.

In sum, the light emitting device of the present disclosure replaces lenses of LED packages with an optically clear adhesive layer and a transparent film, thereby achieving reduced thickness.

BRIEF DESCRIPTION OF THE DRAWINGS

To make the objectives, features, advantages, and examples of the present disclosure, including those mentioned above and others, more comprehensible, descriptions of the accompanying drawings are provided as follows.

FIG. 4 illustrates a cross-sectional view of a light emitting device in accordance with another embodiment of the present disclosure.

FIG. 5 illustrates a cross-sectional view of a light emitting device in accordance with another embodiment of the present disclosure.

DETAILED DESCRIPTION

Figure 1A:
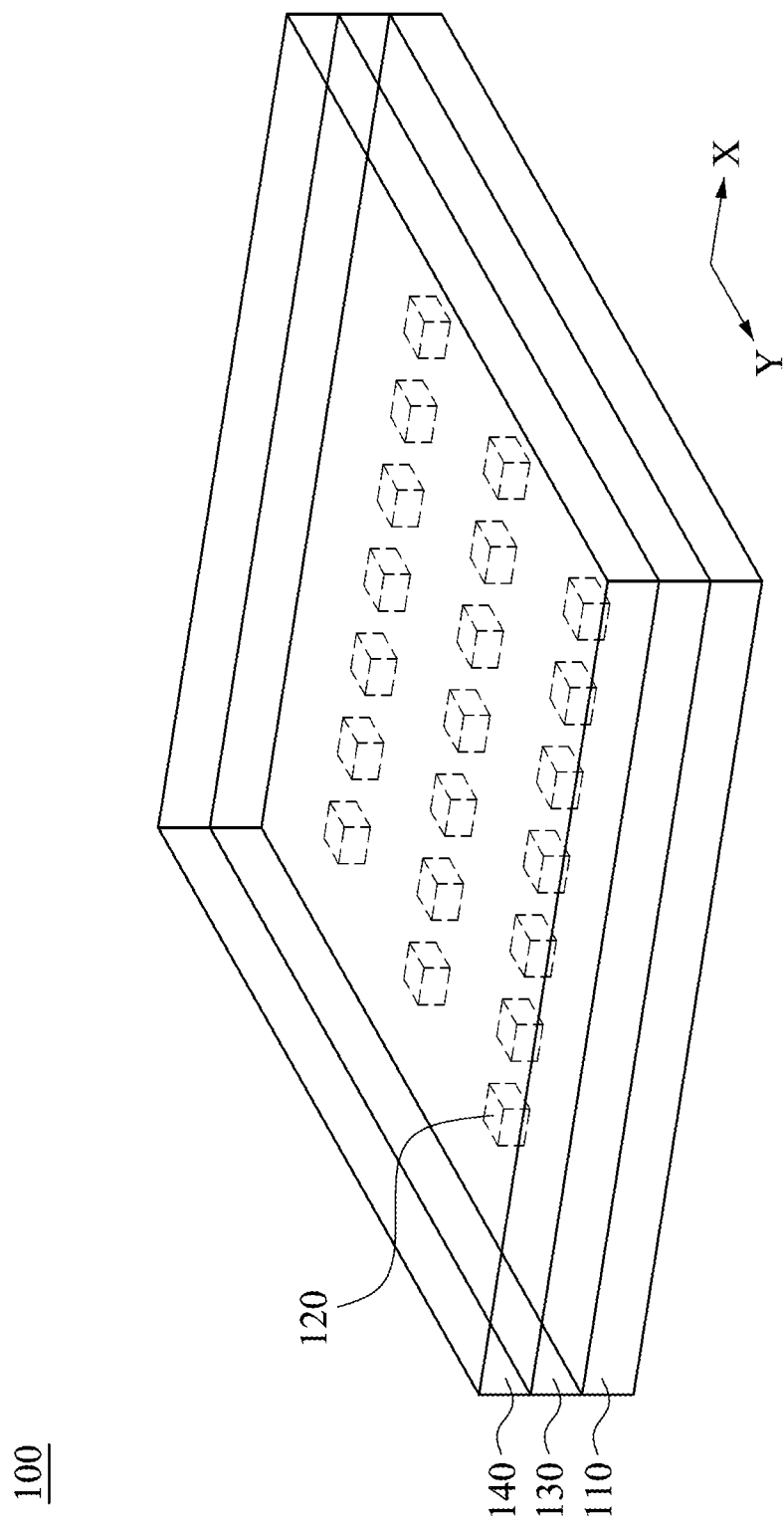
FIG. 1A illustrates a perspective view of a light emitting device in accordance with an embodiment of the present disclosure.

For the sake of the completeness of the description of the present disclosure, reference is made to the accompanying drawings and the various embodiments described below. Various features in the drawings are not drawn to scale and are provided for illustration purposes only. To provide full understanding of the present disclosure, various practical details will be explained in the following descriptions. However, any person with ordinary skill in relevant art should realize that the present disclosure can be implemented without one or more of the practical details. Therefore, these details should not be used to limit the present disclosure.

Figure 1B:
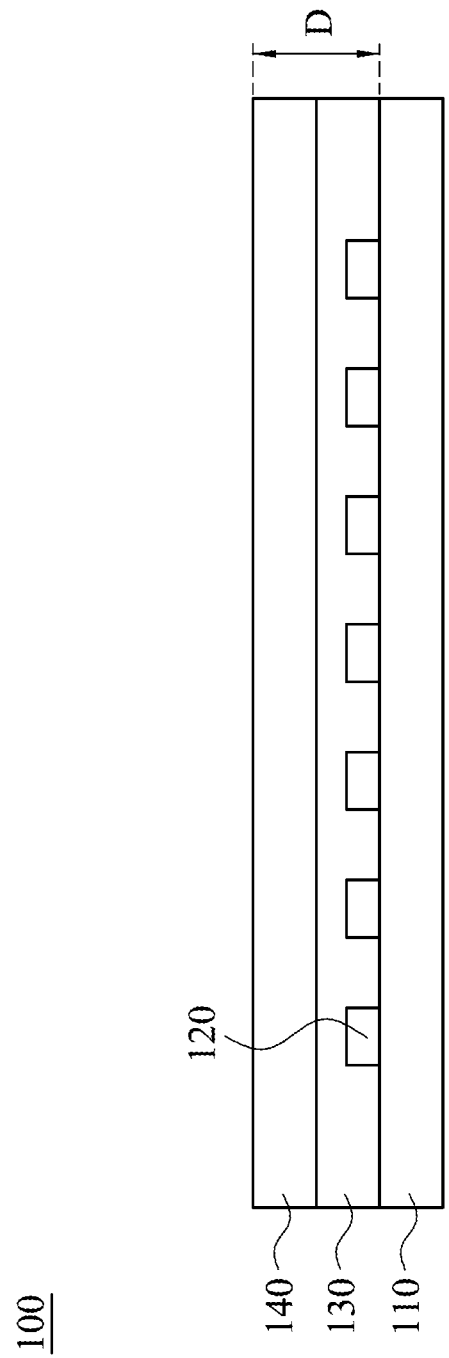
FIG. 1B is a cross-sectional view of the light emitting device shown in FIG. 1A.

Please refer to FIG. 1A and FIG. 1B. FIG. 1A illustrates a perspective view of a light emitting device 100 in accordance with an embodiment of the present disclosure. FIG. 1B is a cross-sectional view of the light emitting device 100 shown in FIG. 1A. The light emitting device 100 includes a circuit board 110, a plurality of light-emitting diodes 120, an optically clear adhesive layer 130, and a transparent film 140. The light-emitting diodes 120 are disposed on a top surface of the circuit board 110 and are arranged in a matrix form. In X-direction, the light-emitting diodes 120 are uniformly spaced apart from each other at a fixed pitch. In Y-direction, the light-emitting diodes 120 are uniformly spaced apart from each other at another fixed pitch. The aforementioned pitches depend on the number of the light-emitting diodes 120 and the size of the circuit board 110. The light-emitting diodes 120 may be LED chips, mini-LED chips, micro-LED chips, or LED packages including at least one LED chip. In addition, typically, a length or width of a LED chip is greater than 500 μm. A length or width of a mini-LED chip is between 50 μm and 500 μm. A length or width of a micro-LED chip is smaller than 50 μm. The light emitting device 100 of the present disclosure may be used as a backlight.

The optically clear adhesive layer 130 is disposed on the top surface of the circuit board 110 and fills the gaps between the light-emitting diodes 120. The optically clear adhesive layer 130 has two opposite sides, including a bottom side close to the circuit board 110 and a top side distant from the circuit board 110. The transparent film 140 is disposed over the top side of the optically clear adhesive layer 130. For example, the transparent film 140 may be disposed over the optically clear adhesive layer 130 and cover the optically clear adhesive layer 130, as shown in FIG. 1B. A hardness of the transparent film 140 is greater than a hardness of the optically clear adhesive layer 130. Therefore, the transparent film 140 can protect the optically clear adhesive layer 130. In some embodiments, the materials forming the transparent film 140 include polyethylene terephthalate (PET), polycarbonate (PC), polymethyl methacrylate (PMMA), cellulose triacetate (TAC), polypropylene (PP), other suitable materials, or any combinations thereof.

With the aforementioned structural configuration, the thickness of the light emitting device 100 can be significantly reduced. In some embodiments, a distance D between a surface of the transparent film 140 distant from the optically clear adhesive layer 130 and the circuit board 110 (i.e., the thickness of the transparent film 140 plus the thickness of the optically clear adhesive layer 130) is smaller than 1.5 mm.

Furthermore, during a fabrication process of a conventional light board, lenses are required to be mounted individually on the light-emitting diodes. Instead, in the light emitting device 100 of the present disclosure, the light-emitting diodes 120 are merely covered by the optically clear adhesive layer 130 and the transparent film 140. Therefore, not only the light emitting device 100 can be fabricated relatively easily, but also the production cost can be further reduced due to the elimination of the lenses.

In addition, the structural configuration of the light emitting device 100 achieves highly reliability. In a reliability test, a tested object is first placed in a −40° C. environment for 20 minutes, and then is heated to 125° C. within 5 minutes. After being maintained at 125° C. for 20 minutes, the tested object is cooled down to −40° C. within 5 minutes, so as to complete a test cycle. The reliability test is conducted on the light emitting device 100 of the present disclosure and the conventional light board. The conventional light board fails after 200 cycles of test. In contrast, the light emitting device 100 of the present disclosure can pass at least 500 cycles of test.

In some embodiments, a refractive index of the transparent film 140 is greater than a refractive index of the optically clear adhesive layer 130, thereby assisting the light emitted by the light-emitting diodes 120 to be effectively transmitted outwards. For example, the refractive index of the optically clear adhesive layer 130 is around 1.475, the refractive index of PET is around 1.575, the refractive index of PC is around 1.6, and the refractive index of PMMA is approximately between 1.4893 and 1.4899.

In some embodiments, based on practical applications, the light emitting device 100 may further include other optical films (not shown) to alter its optical properties. The optical films are stacked and located on a side of the transparent film 140 distant from the optically clear adhesive layer 130. The optical films may be, for example, a wavelength conversion layer, a diffuser, a prism, a brightness enhancement film, or another suitable optical film. In some embodiments, the optical films may be disposed between the transparent film 140 and the optically clear adhesive layer 130. The present disclosure contemplates that the transparent film 140 and the various optical films described above may be stacked on top of the optically clear adhesive layer 130 in any order without affecting their efficacies.

In some embodiments, hardness of the transparent film 140 and the aforementioned optical films increases with increasing distance from the optically clear adhesive layer 130. In some embodiments, refractive indices of the transparent film 140 and the aforementioned optical films increase with increasing distance from the optically clear adhesive layer 130.

Figure 2:
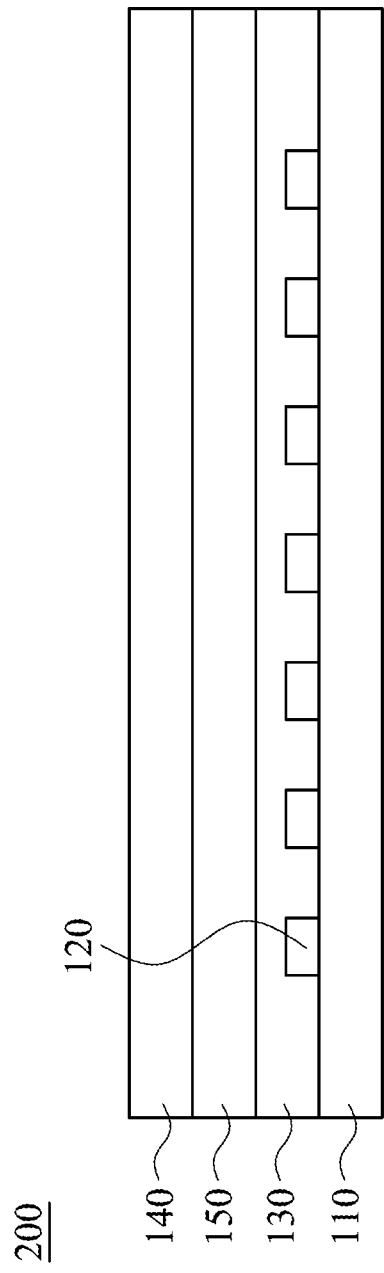
FIG. 2 illustrates a cross-sectional view of a light emitting device in accordance with another embodiment of the present disclosure.

Please refer to FIG. 2, which illustrates a cross-sectional view of a light emitting device 200 in accordance with another embodiment of the present disclosure. The light emitting device 200 includes a circuit board 110, a plurality of light-emitting diodes 120, an optically clear adhesive layer 130, a transparent film 140, and a wavelength conversion layer 150. The circuit board 110, the light-emitting diodes 120, the optically clear adhesive layer 130, and the transparent film 140 are the same as those of the embodiment shown in FIG. 1B. Discussions regarding these elements can be found in the related descriptions above and will not be described again herein. A difference between the present embodiment and the embodiment shown in FIG. 1B is that the present embodiment further includes the wave conversion layer 150 located between the optically clear adhesive layer 130 and the transparent film 140. The wavelength conversion layer 150 is utilized to change the color of the light emitted by the light-emitting diodes 120. For example, the light-emitting diodes 120 may emit blue light, and the wavelength conversion layer 150 may convert a portion of the blue light to non-blue light.

The materials of the wavelength conversion layer 150 may be selected based on practical needs such that the light emitting device 200 emits lights of different colors. For example, the light-emitting diodes 120 may be blue LEDs that emit blue light, and the wavelength conversion layer 150 may include a yellow wavelength conversion material configured to convert a portion of the blue light to a light having a main peak wavelength falling within a yellow spectral range (i.e., yellow light). Therefore, the light emitting device 200 emits white light produced by mixing the yellow light and the remaining blue light. Alternatively, instead of the yellow wavelength conversion material, the wavelength conversion layer 150 may include a green wavelength conversion material configured to convert a portion of the blue light to a light having a main peak wavelength falling within a green spectral range (i.e., green light), and a red wavelength conversion material configured to convert a portion of the blue light to a light having a main peak wavelength falling within a red spectral range (i.e., red light). Therefore, the light emitting device 200 emits white light produced by mixing the green light, the red light, and the remaining blue light.

The yellow wavelength conversion material may be a yellow phosphor powder. The material of the yellow phosphor powder may include YAG:Ce, oxynitride, silicate, nitride, other suitable materials, or any combinations thereof. The green wavelength conversion material may be a green phosphor powder or a green quantum dot material. The material of the green phosphor powder may include β-SiAlON, YAG (yttrium aluminum garnet, $Y_3Al_5O_2$), silicate, nitride, other suitable materials, or any combinations thereof. The green quantum dot material may include CdSe/ZnS, $CsPbBr_3$, other suitable materials, or any combinations thereof. The red wavelength conversion material may be a red phosphor powder or a red quantum dot material. The red quantum dot material may include InP, CdSe/ZnS, $CsPbI_3$, other suitable materials, or any combinations thereof. The materials of the red phosphor powder may include $A_2MF_6$:$Mn^{4+}$, in which A may be Li, Na, K, Rb, Cs, $NH_4$, other suitable elements/compounds, or any combinations thereof, and M may be Ge, Si, Sn, Ti, Zr, other suitable elements/compounds, or any combinations thereof. The materials of the red phosphor powder may also include SrS:Eu、CaS:Eu、$Ca_2Si_5N_8$:Eu、$Sr_2Si_5N_8$:Eu、$CaAlSiN_3$:Eu、$Sr_3SiO_5$:Eu、$Ba_3SiO_5$:Eu, other suitable materials, or any combinations thereof.

Figure 3:
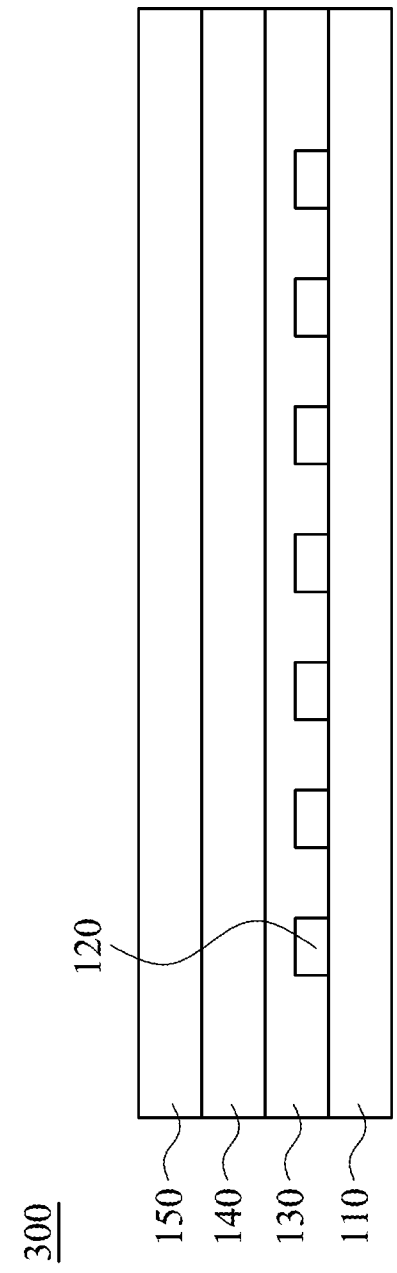
FIG. 3 illustrates a cross-sectional view of a light emitting device in accordance with another embodiment of the present disclosure.

Please refer to FIG. 3, which illustrates a cross-sectional view of a light emitting device 300 in accordance with another embodiment of the present disclosure. A difference between the present embodiment and the embodiment shown in FIG. 2 is that the wavelength conversion layer 150 of the present embodiment is disposed on a side of the transparent film 140 distant from the optically clear adhesive layer 130. The embodiments shown in FIGS. 2 and 3 are merely illustrated as examples. The present disclosure is not limited thereto. The present disclosure contemplates that the wavelength conversion layer 150 may be disposed anywhere on the side of the optically clear adhesive layer 130 distant from the circuit board 110.

Figure 6:
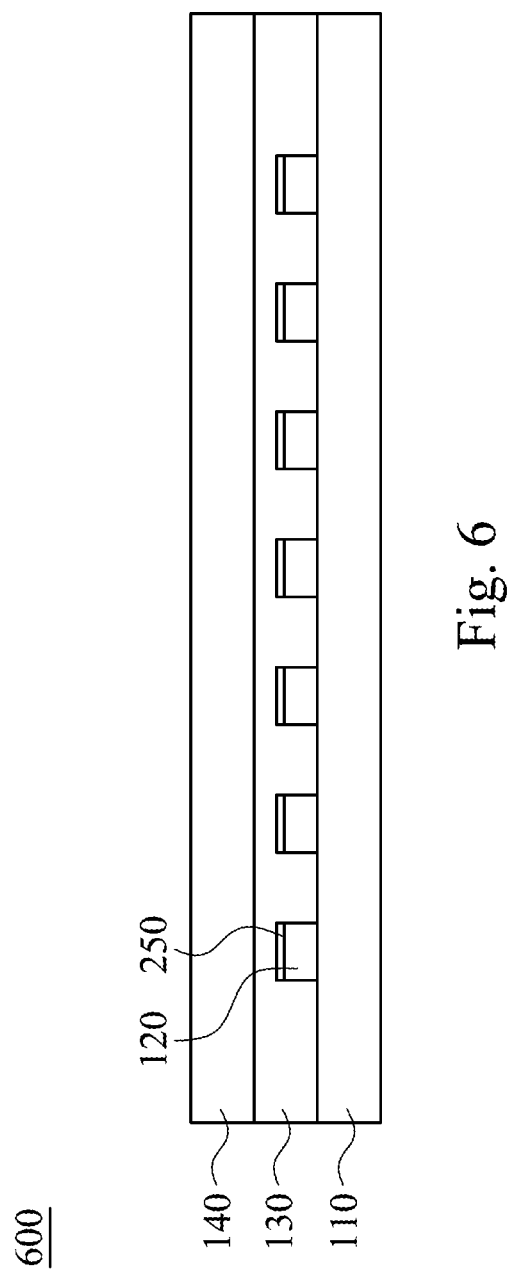
FIG. 6 illustrates a cross-sectional view of a light emitting device in accordance with another embodiment of the present disclosure.

Please refer to FIG. 4, which illustrates a cross-sectional view of a light emitting device 400 in accordance with another embodiment of the present disclosure. A difference between the present embodiment and the embodiment shown in FIGS. 2 and 3 is that the light emitting device 400 of the present disclosure replaces the wavelength conversion layer 150 with a wavelength conversion material 250 distributed in the optically clear adhesive layer 130, thereby further reducing the thickness of the light emitting device. In some other embodiments, as shown in FIG. 5, the light emitting device 500 includes wavelength conversion material 250 distributed in the transparent film 140. In other embodiments, as shown in FIG. 6, the light emitting device 600 includes a wavelength conversion material 250 disposed over the light-emitting diodes 120. The embodiments shown in FIGS. 4-6 are merely illustrated as examples. The present disclosure is not limited thereto. The present disclosure contemplates that the wavelength conversion material 250 may be distributed in any optical film on the side of the optically clear adhesive layer 130 distant from the circuit board 110.

Figure 7A:
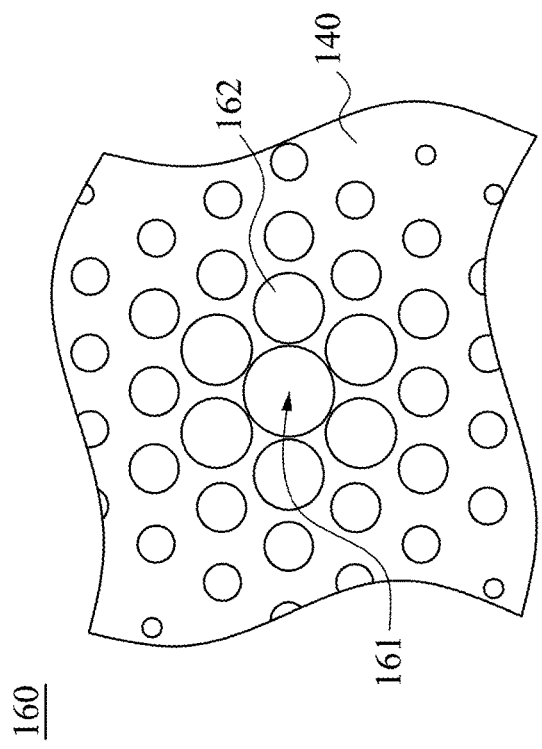
FIG. 7A illustrates a partially enlarged top view of a light emitting device in accordance with another embodiment of the present disclosure.
Figure 7B:
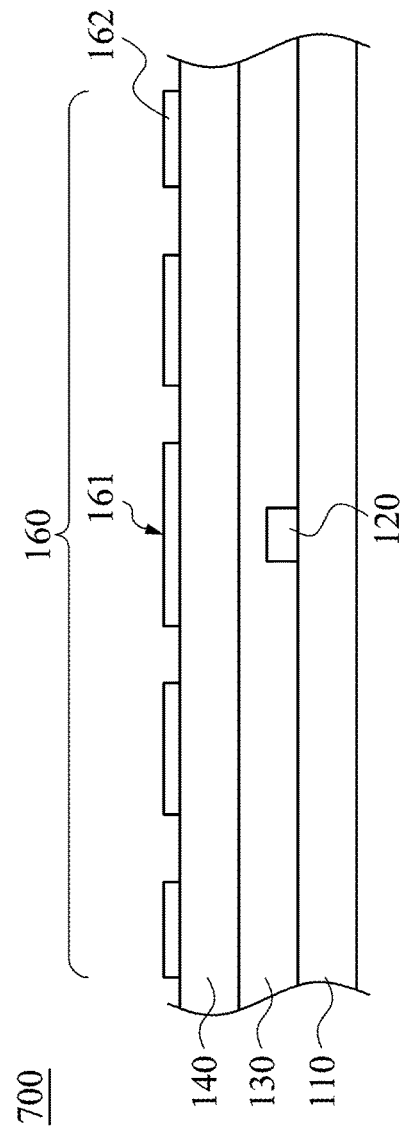
FIG. 7B is a partially enlarged cross-sectional view of light emitting device shown in FIG. 7A.

Please refer to FIGS. 7A and 7B. FIG. 7A illustrates a partially enlarged top view of a light emitting device 700 in accordance with another embodiment of the present disclosure, and FIG. 7B is a partially enlarged cross-sectional view of light emitting device 700 shown in FIG. 7A. A difference between the present embodiment and the embodiment shown in FIG. 1B is that the light emitting device 700 of the present embodiment has plural optical pattern groups 160 located on a side of the transparent film 140 distant from the optically clear adhesive layer 130 (i.e., the optical pattern groups 160 are located on a top surface of transparent film 140). The optical pattern groups 160 are utilized to reflect the light emitted by the light-emitting diodes 120.

In some embodiments, as shown in FIG. 7B, each of the optical pattern groups 160 has a center 161 aligned with a corresponding one of the light-emitting diodes 120 in a direction perpendicular to the circuit board 110. Each of the optical pattern groups 160 includes plural reflective patterns 162 (such as circular reflective patterns shown in FIG. 7A). The reflective patterns 162 may have various sizes and are arranged outwardly from the center 161 in order of decreasing size. Specifically, one reflective pattern 162 with the largest size is located at the center, and other reflective patterns 162 with the second largest size surround the one with the largest size, and so on. As a result, the light emitted by the light-emitting diodes 120 can be diffused outwards and become uniform.

In some embodiments, the material of reflective patterns 162 includes aluminum oxide ($Al_2O_3$), boron nitride (BN), microcellular polyethylene terephthalate (MCPET), barium sulfate ($BaSO_4$), calcium carbonate ($CaCO_3$), titanium dioxide ($TiO_2$), silicon dioxide ($SiO_2$), other suitable materials, or any combinations thereof.

Figure 8:
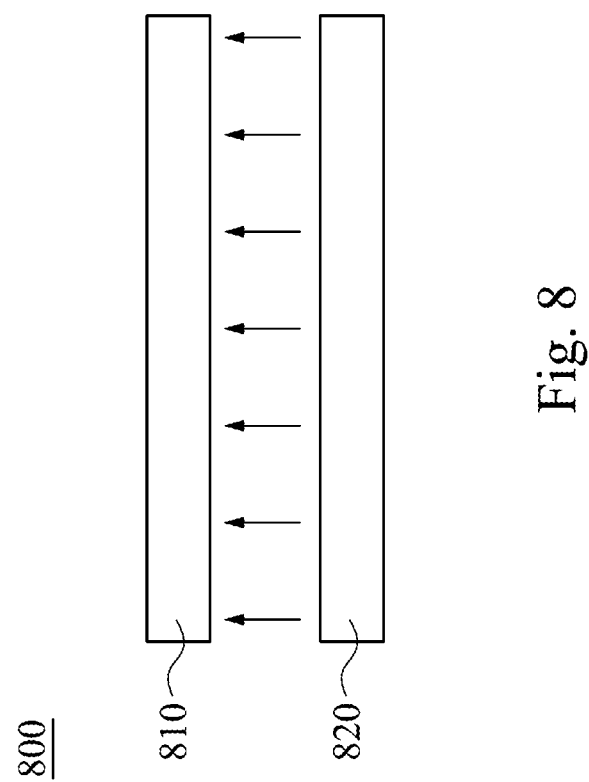
FIG. 8 illustrates a schematic side view of a display device in accordance with an embodiment of the present disclosure.

Please refer to FIG. 8, which illustrates a schematic side view of a display device 800 in accordance with an embodiment of the present disclosure. The display device 800 includes a display panel 810 and a backlight module 820. The backlight module 820 may include any one of the aforementioned light emitting devices 100, 200, 300, 400, 500, 600, and 700. Consequently, display device 800 may incorporate a thinner design by reducing the thickness of the backlight module 820. In some embodiments, the display device may further include a light guiding plate (not shown) disposed between the display panel 810 and the backlight module 820, but the present disclosure is not limited thereto.

Although the present disclosure has been disclosed by the above embodiments, the present disclosure is not limited thereto. Any person skilled in the art can make various changes and modifications without departing from the spirit and the scope of the present disclosure. Therefore, the protective scope of the present disclosure shall be the scope of the claims as attached.

What is claimed is:

1. A light emitting device, comprising:
    a circuit board;
    a plurality of light-emitting diodes disposed on a surface of the circuit board;
    an optically clear adhesive layer disposed on the surface of the circuit board and covering the light-emitting diodes, the optically clear adhesive layer filling gaps between the light-emitting diodes; and
    a transparent film disposed over a side of the optically clear adhesive layer distant from the circuit board, wherein a hardness of the transparent film is greater than a hardness of the optically clear adhesive layer.

2. The light emitting device of claim 1, wherein a refractive index of the transparent film is greater than a refractive index of the optically clear adhesive layer.

3. The light emitting device of claim 1, wherein the transparent film is formed from materials comprising at least one of polyethylene terephthalate, polycarbonate, polymethyl methacrylate, cellulose triacetate, and polypropylene.

4. The light emitting device of claim 1, wherein a distance between a surface of the transparent film distant from the optically clear adhesive layer and the circuit board is smaller than 1.5 mm.

5. The light emitting device of claim 1, wherein the light-emitting diodes comprise blue light-emitting diodes.

6. The light emitting device of claim 5, further comprising a wavelength conversion layer that is disposed on a side of the transparent film distant from the optically clear adhesive layer or is disposed between the optically clear adhesive layer and the transparent film, wherein the wavelength conversion layer is configured to convert a portion of blue light emitted by the blue light-emitting diodes to non-blue light.

7. The light emitting device of claim 6, wherein the wavelength conversion layer comprises a first wavelength conversion material configured to generate light having a main peak wavelength falling within a yellow spectral range.

8. The light emitting device of claim 6, wherein the wavelength conversion layer comprises a second wavelength conversion material configured to generate light having a main peak wavelength falling within a green spectral range, and a third wavelength conversion material configured to generate light having a main peak wavelength falling within a red spectral range.

9. The light emitting device of claim 1, wherein the light-emitting diodes comprise LED chips, mini LED chips, micro LED chips, or LED packages.

10. The light emitting device of claim 1, further comprising a wavelength conversion material disposed over the light-emitting diodes.

11. The light emitting device of claim 1, further comprising a wavelength conversion material distributed in the optically clear adhesive layer or the transparent film.

12. The light emitting device of claim 1, wherein a surface of the transparent film away from the optically clear adhesive layer has a plurality of optical pattern groups configured to reflect light emitted by the light-emitting diodes.

13. The light emitting device of claim 12, wherein each of the optical pattern groups comprises a plurality of reflective patterns, each of the optical pattern groups has a center aligned with a corresponding one of the light-emitting diodes, and the reflective patterns in each of the optical pattern groups are arranged outwardly from the center in order of decreasing size.

14. The light emitting device of claim 13, wherein the reflective patterns are formed from materials comprising at least one of aluminum oxide, boron nitride, microcellular polyethylene terephthalate, barium sulfate, calcium carbonate, titanium dioxide and silicon dioxide.

15. A backlight module, comprising the light emitting device of claim 1.

16. The backlight module of claim 15, wherein a refractive index of the transparent film is greater than a refractive index of the optically clear adhesive layer.

17. The backlight module of claim 15, wherein a distance between a surface of the transparent film distant from the optically clear adhesive layer and the circuit board is smaller than 1.5 mm.

18. The backlight module of claim 15, wherein the light-emitting diodes comprise blue light-emitting diodes.

19. The backlight module of claim 18, wherein the light emitting device further comprises a wavelength conversion layer that is disposed on a side of the transparent film distant from the optically clear adhesive layer or is disposed between the optically clear adhesive layer and the transparent film, wherein the wavelength conversion layer is configured to convert a portion of blue light emitted by the blue light-emitting diodes to non-blue light.

20. The backlight module of claim 15, wherein a surface of the transparent film away from the optically clear adhesive layer has a plurality of optical pattern groups configured to reflect light emitted by the light-emitting diodes.

* * * * *